(12) United States Patent
Yoshikawa et al.

(10) Patent No.: US 8,047,244 B2
(45) Date of Patent: Nov. 1, 2011

(54) PNEUMATIC TIRE WITH TREAD HAVING RADIALLY EXTENDING FINE GROOVES

(75) Inventors: Hideaki Yoshikawa, Kobe (JP);
Masahiro Tamura, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 1072 days.

(21) Appl. No.: 11/892,553

(22) Filed: Aug. 23, 2007

(65) Prior Publication Data

US 2008/0047644 A1 Feb. 28, 2008

(30) Foreign Application Priority Data

Aug. 24, 2006 (JP) .................................. 2006-228162

(51) Int. Cl.
*B60C 11/11* (2006.01)

(52) U.S. Cl. ......... 152/209.18; 152/209.21; 152/209.24; 152/902; 152/DIG. 3

(58) Field of Classification Search ............. 152/209.18, 152/209.21, 209.24, 902, DIG. 3
See application file for complete search history.

(56) References Cited

U.S. PATENT DOCUMENTS

| | | | |
|---|---|---|---|
| 5,031,680 A * | 7/1991 | Kajikawa et al. | 152/209.21 |
| 6,408,910 B1 * | 6/2002 | Lagnier et al. | 152/209.17 |
| 2003/0111150 A1 * | 6/2003 | Zimmer et al. | 152/209.19 |
| 2008/0047641 A1 * | 2/2008 | Takahashi | 152/209.3 |

FOREIGN PATENT DOCUMENTS

| | | | |
|---|---|---|---|
| DE | 3627832 | * | 2/1988 |
| EP | 1048488 | * | 11/2000 |
| GB | 460338 | * | 1/1937 |
| JP | 59-025684 | * | 7/1984 |
| JP | 09-164817 | * | 6/1997 |
| JP | 10-287110 | * | 10/1998 |
| JP | 10-315711 | * | 12/1998 |
| JP | 2003-146024 | * | 5/2003 |
| JP | 2003-146024 A | | 5/2003 |
| JP | 2005-231600 | * | 9/2005 |

OTHER PUBLICATIONS

Machine translation for German 3,627,832 (no date).*
Machine translation for Japan 2003-146024 (no date).*
Translation for Japan 59-025684 (no date).*
Machine translation for Japan 10-315711 (no date).*
Machine translation for Japan 10-287110 (no date).*
Machine translation for Japan 2005-231600 (no date).*
Machine translation for Japan 09-164817 (no date).*

* cited by examiner

*Primary Examiner* — Steven D Maki
(74) *Attorney, Agent, or Firm* — Birch, Stewart, Kolasch & Birch, LLP (57) ABSTRACT

A pneumatic tire having an improved noise performance without deteriorating the drainage performance and having in a tread portion at least one circumferential main groove 3 which extend continuously in the tire circumferential direction, wherein the circumferential main groove 3 has a pair of groove walls 6, and in at least one of the groove walls 6 are provided at intervals in the tire circumferential direction a plurality of fine grooves 9 each of which extends in the tire radial direction and is provided in at least a part of its inner surface with a non-flat portion 10 extending in a wave-like form in its length direction.

10 Claims, 7 Drawing Sheets

FIG.8

PNEUMATIC TIRE WITH TREAD HAVING RADIALLY EXTENDING FINE GROOVES

BACKGROUND OF THE INVENTION

The present invention relates to a pneumatic tire having a good noise performance improved without deteriorating a drainage property.

Pneumatic tires are usually provided on its tread portion with one or a plurality of wide circumferential main grooves which extend in the circumferential direction of tire. However, such circumferential grooves are easy to generate columnar resonance during running, so the tires tend to be poor in noise performance. If the width of the circumferential grooves is decreased for the purpose of improving the noise performance, the drainage performance is deteriorated. Like this, the noise performance is repugnant with the drainage performance.

Various proposals to improve these performances have been made. For example, JP-A-2003-146024 discloses a pneumatic tire in which for the purpose of improving the wet grip performance without impairing the noise performance, at least one corner between the tread surface and the wall of a circumferential main groove is cut off to form a slant groove wall, and fine grooves having a width of 0.3 to 1.2 mm and a depth of 0.3 to 1.5 mm are provided in the slant groove surface at intervals of 1.4 to 3.0 mm.

It is an object of the present invention to provide a pneumatic tire having an improved noise performance without deteriorating the drainage performance.

A further object of the present invention is to provide a heavy duty pneumatic tire having excellent noise and drainage performances.

These and other objects of the present invention will become apparent from the description hereinafter.

SUMMARY OF THE INVENTION

It has been found that when a large number of short and narrow grooves, each of which extends in the radial direction of a tire and has a non-flat portion extending in a wave-like concave-convex form in the groove length direction in at least one of the groove bottom and the groove walls, are provided in one or both walls of a circumferential main groove extending in the circumferential direction of the tire at intervals in the circumferential direction of the tire, an air current in the circumferential groove is disturbed to reduce the columnar resonance, thus improving the noise performance without impairing the drainage performance.

In accordance with the present invention, there is provided a pneumatic tire having in a tread portion at least one circumferential main groove which extend continuously in the tire circumferential direction, wherein the circumferential main groove has a pair of groove walls, and in at least one of the groove walls are provided at intervals in the tire circumferential direction fine grooves each of which extends in the tire radial direction and is provided in at least a part of its inner surface with a non-flat portion extending in a wave-like form in its length direction.

Typically, the non-flat portion has a zigzag surface extending in a zigzag form in the length direction of the fine groove. In the cross section perpendicular to the zigzag surface, the zigzag form has preferably an amplitude of 0.3 to 2.0 mm, and has at least one vertex, preferably 2 to 4 vertexes. In the cross section perpendicular to the length direction of the fine groove, preferably the fine groove has a groove width of 0.5 to 4.0 mm and a groove depth of 0.5 to 2.0 mm.

The zigzag surface may be provided in the bottom of the fine groove or may be provided in one or both facing walls of the fine groove. The zigzag surface may comprise a first zigzag surface and a second zigzag surface which is disposed adjacent to the first zigzag surface in a phase different from that of the first zigzag surface.

Preferably, the fine grooves are provided at intervals of 3.5 to 8.0 mm along the wall of the circumferential main groove.

Preferably, at least one circumferential main groove includes a shoulder circumferential groove which extends continuously in the tire circumferential direction on a tread ground contact edge side of the tire and which is provided with the fine grooves.

In a preferable embodiment, the fine grooves are provided in both wall surfaces of the circumferential main groove at locations asymmetric with respect to the center line of the circumferential main groove.

A plurality of the fine grooves extending in the tire radial direction and having a non-flat surface extending in a wave-like form in its length direction, which are provided in the wall or walls of at least one circumferential groove at intervals in the tire circumferential direction, serves to disturb an air current which generates in the circumferential groove when the tire rotates, to reduce the columnar resonance sound. That is to say, a sound wave in the column is reflected diffusely by the non-flat portion of each fine groove to increase the number of reflections to the groove walls. Since a part of the sound energy is absorbed by the groove wall on every reflection, the sound pressure level of the columnar resonance is decreased. Like this, according to the present invention, the traveling noise of a tire can be reduced without lowering the groove volume.

DETAILED DESCRIPTION OF THE INVENTION

An embodiment of the present invention will now be explained with reference to the accompanying drawings.

Figure 1:
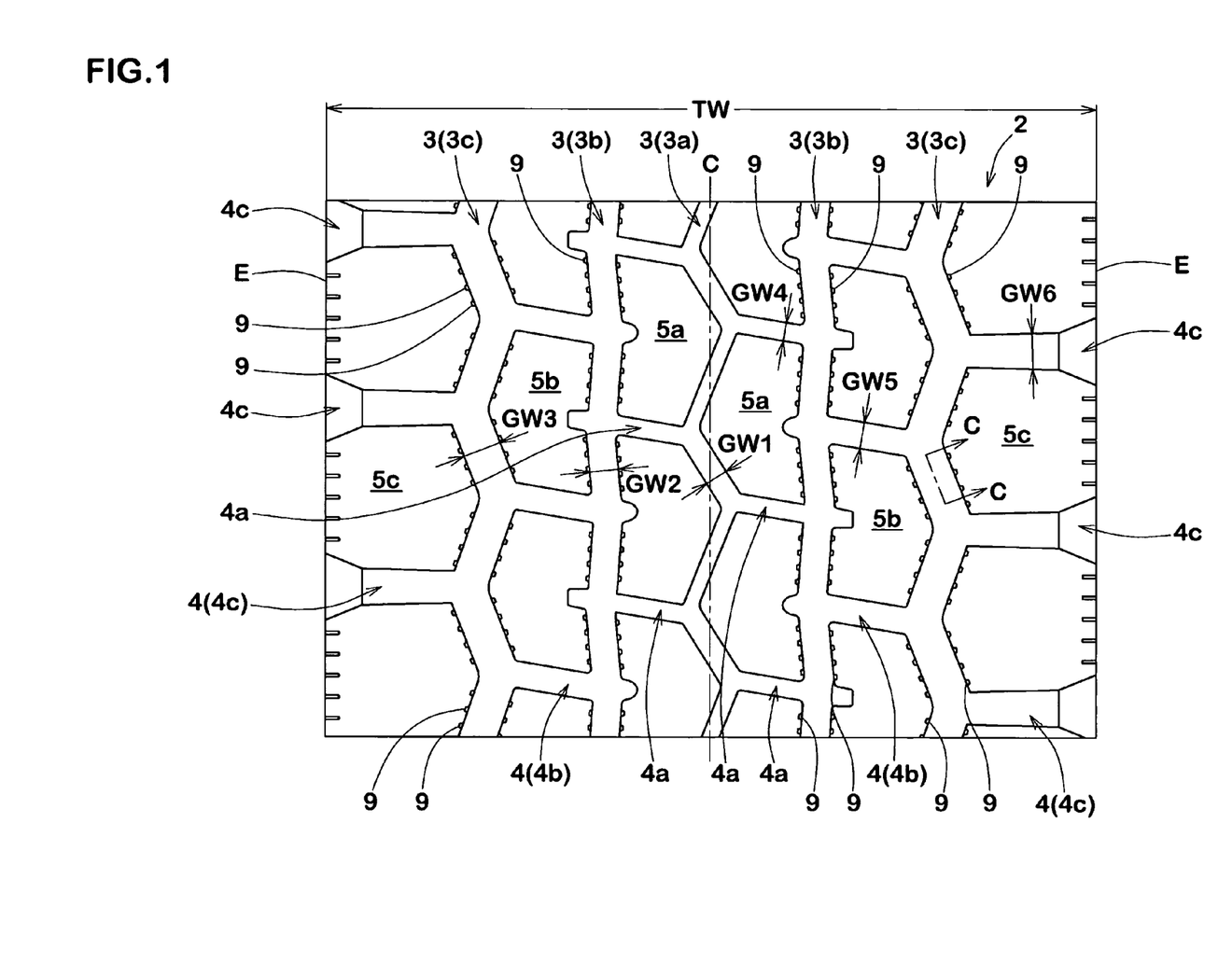
FIG. 1 is a development of the tread portion of a pneumatic tire according to an embodiment of the present invention.
Figure 2:
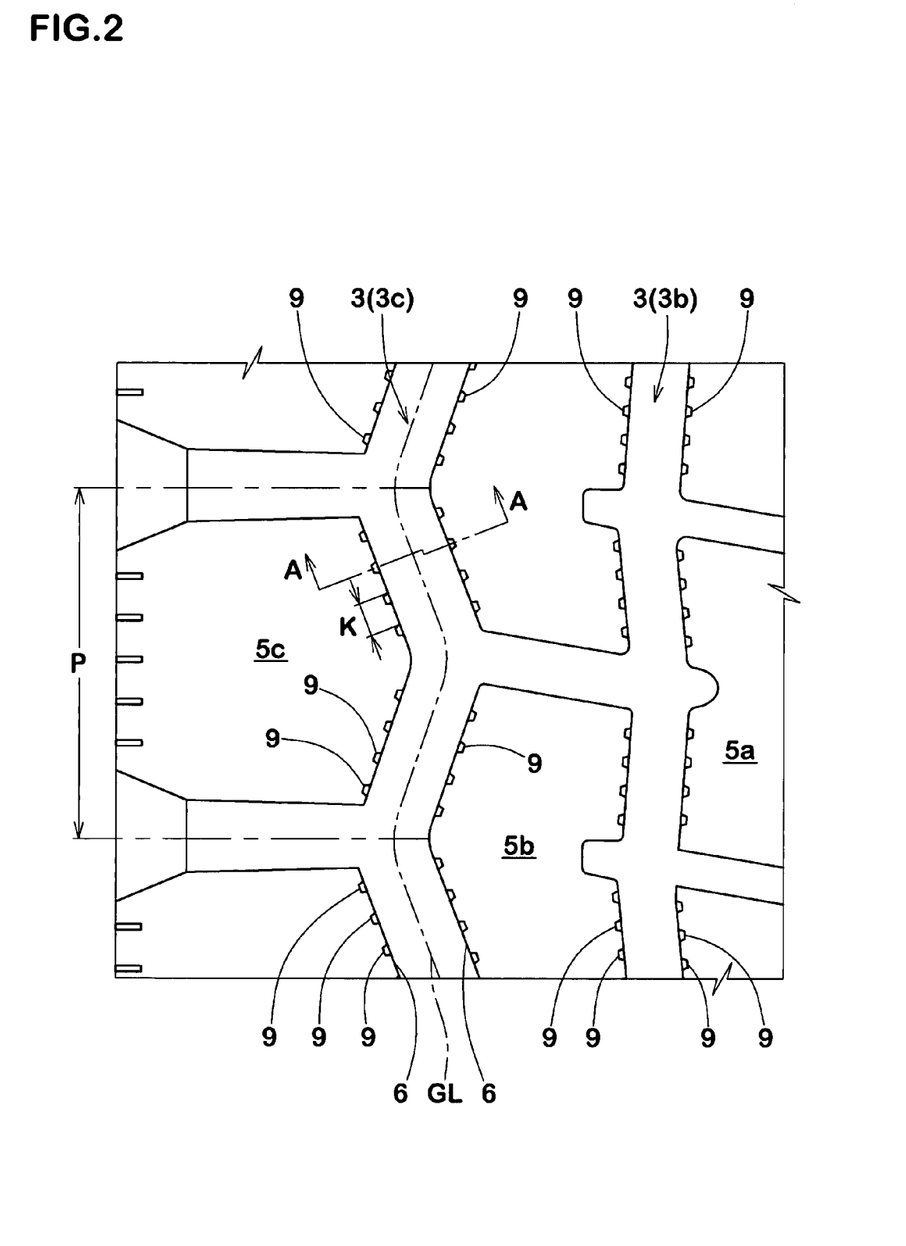
FIG. 2 is an enlarged view of a part of FIG. 1.
Figure 3:
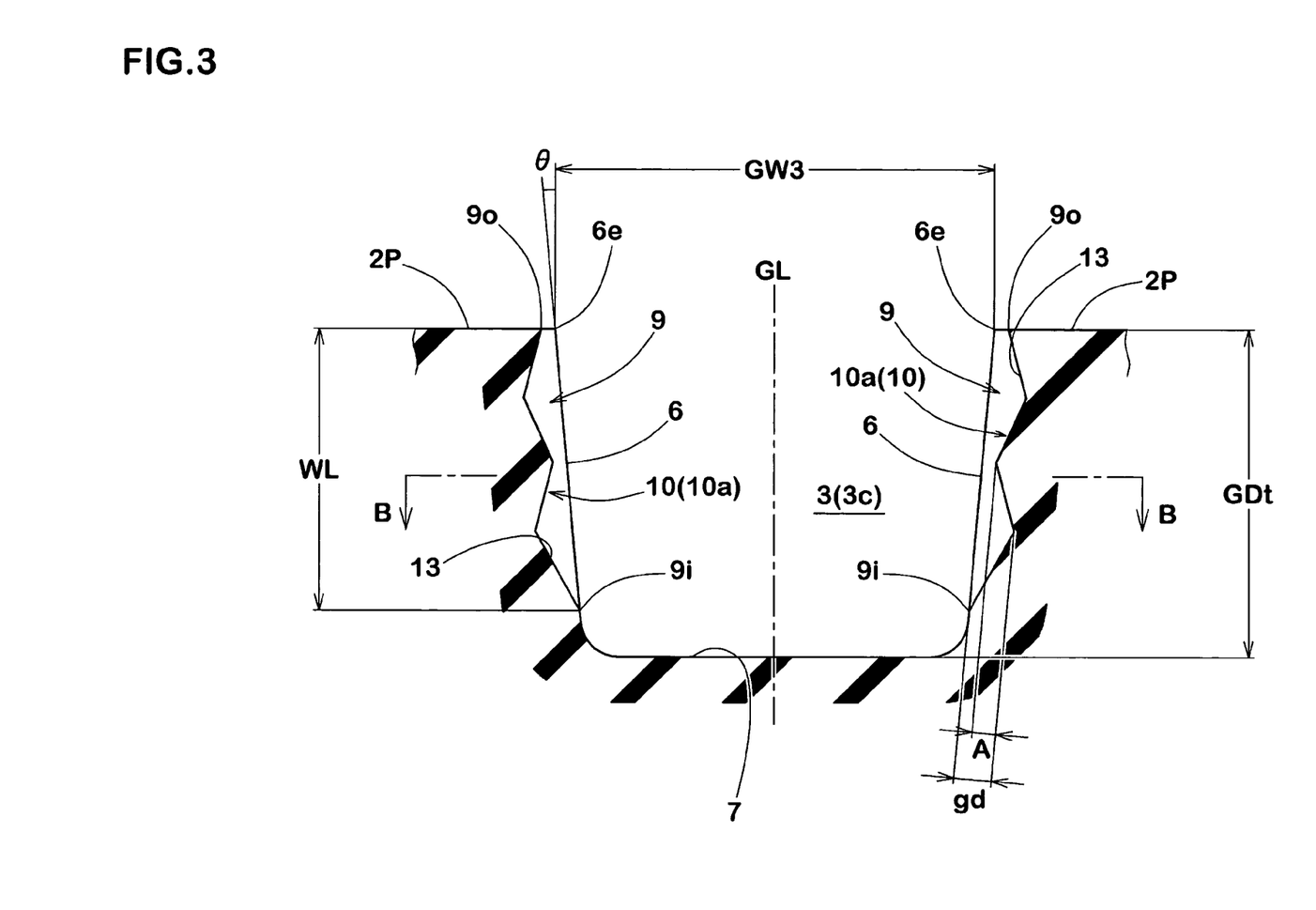
FIG. 3 is a cross sectional view taken on line A-A in FIG. 2.
Figure 4:
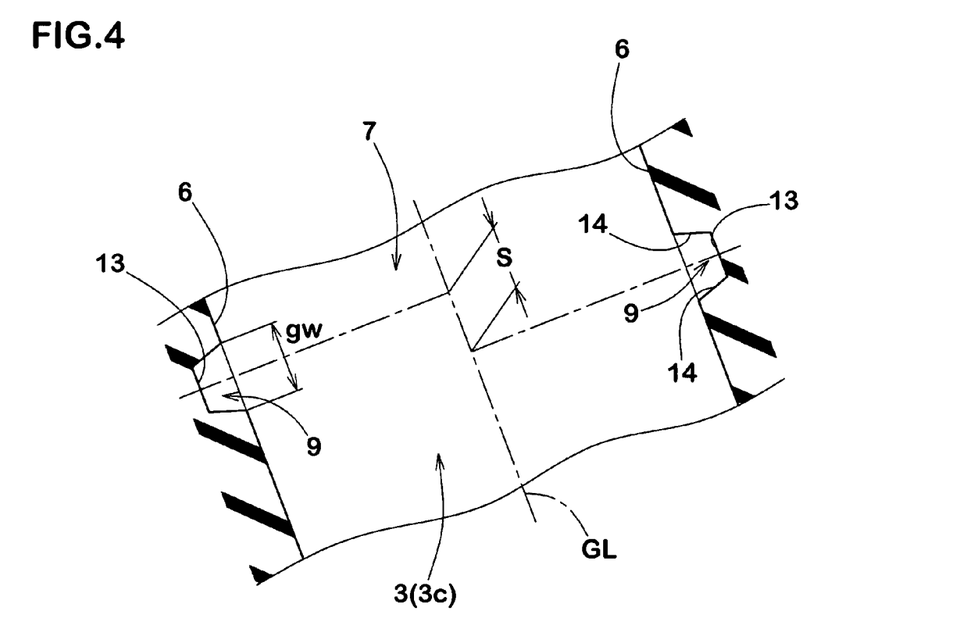
FIG. 4 is a cross sectional view taken on line B-B in FIG. 3.

FIG. 1 is a development of a tread portion 2 of a pneumatic tire according to an embodiment of the present invention, FIG. 2 is an enlarged view of a part of FIG. 1, FIG. 3 is an enlarged cross sectional view taken along line A-A in FIG. 2, and FIG. 4 is an enlarged cross sectional view taken along line B-B in FIG. 3.

Preferably, the pneumatic tire according to this embodiment is a heavy duty pneumatic tire including, for example, a carcass comprising a single ply of steel cords, and a belt layer disposed radially outward of the carcass and comprising at least two belt plies, preferably at least three belt plies, of steel cords.

The tread portion 2 is provided with at least one circumferential main groove 3 which extends continuously in the tire circumferential direction, preferably with at least three circumferential main grooves 3 (five circumferential grooves 3 in this embodiment shown in the drawings) and a plurality of lateral grooves 4 extending in a direction intersecting the circumferential grooves 3.

The five circumferential grooves 3 in this embodiment include a single crown circumferential main groove 3a which extends on or in the vicinity of the tire equator C (in case of the tire shown in FIG. 1, in a center region including the tire equator C), a pair of shoulder circumferential main grooves 3c which extend continuously in the tire circumferential direction in shoulder regions of the tread portion 2, and a pair of middle circumferential main grooves 3b which extend continuously in the tire circumferential direction between the crown and shoulder grooves 3a and 3c.

Further, the lateral grooves 4 include center lateral grooves 4a which extend between the crown circumferential groove 3a and each of the middle circumferential grooves 3b, middle lateral grooves 4b which extend between each middle circumferential groove 3b and each shoulder circumferential groove 3c, and shoulder lateral grooves 4c which extend between each shoulder circumferential groove 3c and each of tread ground contact edges E.

The tread ground contact edges E denote axially outermost edges of a ground contact area of a tire under a standard loaded condition in which to the tire in the standard state that the tire is mounted on a standard rim and inflated to a standard pressure and no load is applied to the tire, a standard load is applied to bring the tread portion 2 of the tire into contact with a plane surface at a camber angle of 0°. The axial distance between both tread contact edges E, E is defined as a tread width TW.

The term "standard rim" as used herein means a rim defined for every tire in a standardizing system on which the tire is based and, for example, denotes "standard rim" in JATMA, "design rim" in TRA and "measuring rim" in ETRTO. Also, the term "standard pressure" as used herein means an air pressure defined for every tire in the standardizing system and, for example, denotes the "maximum air pressure" in JATMA, the maximum value recited in the table of "Tire Load Limits at Various Cold Inflation Pressures" in TRA, and the "inflation pressure" in ETRTO. Further, the term "standard load" as used herein means a load defined for every tire in the standardizing system and, for example, denotes the "maximum load capacity" in JATMA, the maximum value recited in the table of "Tire Load Limits at Various Cold Inflation Pressures" in TRA, and the "load capacity" in ETRTO.

By the circumferential grooves 3 and lateral grooves 4 as mentioned above, the tread portion 2 is provided with crown blocks 5a defined between the crown circumferential groove 3a and each middle circumferential groove 3b, middle blocks 5b defined between each middle circumferential groove 3b and each shoulder circumferential groove 3c, and shoulder blocks 5c defined between each shoulder circumferential groove 3c and each tread ground contact edge E.

In this embodiment, all circumferential main grooves 3a to 3c extend circumferentially in a zigzag form as shown in FIG. 1. Such zigzag grooves impart approximately sideways V-shaped edges to side edges of the blocks 5a to 5c when viewed from the above and serve to enhance the traction performance in a good balance. Of course, the circumferential main grooves may have other various shapes such as a straight groove which extends in the tire circumferential direction in a straight line manner, a waved groove, and the like.

In order to enhance the traction performance of the blocks 5a to 5c, it is preferable that the center lateral grooves 4a and the middle lateral grooves 4b are inclined in the same direction (in FIG. 1, left side upward inclination) at an angle of at most 45°, especially at most 30°, with respect to the tire axial direction. On the other hand, it is preferable that the shoulder lateral grooves 4c extend substantially along the tire axial direction such that the inclination angle is within the range of 0 to 5° with respect to the axial direction, whereby a sufficient rigidity is imparted to the shoulder blocks 5c. Further, it is preferable that the lateral grooves 4 are disposed to connect vertexes of a zigzag circumferential groove 3 with vertexes of an adjacent zigzag circumferential groove 3.

Further, it is preferable that the crown circumferential groove 3a, the middle circumferential groove 3b and the shoulder circumferential groove 3c have groove widths GW1, GW2 and GW3 satisfying the following relationship: GW1<GW2<GW3, whereby the pattern rigidity of a portion in the vicinity of the tire equator C at which the ground contact pressure is high can be enhanced. On the other hand, portions on the tread ground contact edge E side are greatly deformed when a load or an inner pressure is applied. Therefore, it is preferable to provide relatively large circular arc-like corners at the bottom 7 of the shoulder and middle circumferential grooves 3c and 3b to thereby ease a strain. From such a point of view, too, it is preferable that the groove widths GW2 and GW3 of the circumferential grooves 3b and 3c are larger than the groove width GW1 of the crown circumferential groove 3a. In case that the width of a groove varies, the average value thereof is used.

The width and depth of the circumferential grooves 3 and lateral grooves 4 are not particularly limited. However, if they are too small, the drainage performance tends to be deteriorated, and if they are too large, the pattern rigidity and noise performance of the tread portion 2 may be deteriorated. Therefore, the groove widths GW1 to GW3 of the circumferential grooves 3 are preferably at least 1.5% of the tread width TW, more preferably at least 2.5% of the tread width TW, and are preferably at most 6.5% of the tread width TW, more preferably at most 5.5% of the tread width TW. Further, the groove depth GDt of the circumferential grooves 3 is preferably at least 4.0% of the tread width TW, more preferably at least 5.0% of the tread width TW, and is preferably at most 9.0% of the tread width TW, more preferably at most 8.0% of the tread width TW.

Similarly, the groove widths GW4 to GW6 of the center lateral grooves 4a, middle lateral grooves 4b and shoulder lateral grooves 4c are preferably at least 1.5% of the tread width TW, more preferably at least 2.5% of the tread width TW, and are preferably at most 6.5% of the tread width TW, more preferably at most 5.5% of the tread width TW. Further, the groove depth GDy of the lateral grooves 4 is preferably at least 2.0% of the tread width TW, more preferably at least 2.5% of the tread width TW, and is preferably at most 9.0% of the tread width TW, more preferably at most 8.0% of the tread width TW.

As shown in FIG. 3 by the shoulder circumferential groove 3c as the representative of the circumferential grooves 3, the circumferential grooves 3 have a pair of groove walls 6, 6 and a groove bottom 7 extending between the walls 6, 6. The groove walls 6 are inclined to increase the groove width from the groove bottom 7 toward the radially outside. The groove walls 6, 6 are disposed symmetrically with respect to the center line GL of the groove. Preferably, the walls 6 and the bottom 7 are connected through smooth circular arcs, namely rounded corners, in order to prevent stress concentration at the corners.

The angle θ of inclination of the groove walls 6 with respect to a normal line drawn to a groove edge 6e on the tread surface that is the radially outermost location of the wall 6 of the circumferential groove 3, is preferably at least 1°, more preferably at least 3°, and is preferably at most 30°, more preferably at most 20°. If the inclination angle θ is more than 30°, a large groove width is needed to obtain a sufficient groove depth. If the inclination angle θ is less than 1°, the productivity tends to be deteriorated because of lowering in releasability of a tire from a mold.

In the present invention, a plurality of fine grooves 9 extending radially are disposed in either one or both of facing walls 6, 6 of at least one circumferential main groove 3 at intervals in the tire circumferential direction. Preferably, the fine grooves 9 are disposed at least in shoulder circumferential grooves 3c. The interval of the disposition may be constant or not. Each of the fine grooves 9 has a non-flat portion 10 which extends in a wave-like form in its length direction, in at least a part of its inner surface, especially in at least one of the groove bottom and walls. In this embodiment shown in FIGS. 1 to 6, a large number of the fine grooves 9 are disposed in both walls 6, 6 of all circumferential main grooves 3a to 3c at intervals in the circumferential direction.

Such fine grooves 9 serve to disturb an air current which generates in the circumferential grooves when the tire rotates, thus preventing generation of standing wave which is a cause of a noise. Further, a part of a sound wave generated by the air current is reflected diffusely by the non-flat portion 10 of each fine groove 9 to repeat reflection to groove walls 6 and/or groove bottom 7, whereby the sound wave energy is absorbed. Thus, the columnar resonance occurring in the circumferential grooves 3a to 3c is suppressed to greatly reduce the traveling noise of a tire, especially the pass-by noise. Further, since the fine grooves are provided without decreasing the volume of the circumferential grooves 3, there is no fear of deteriorating the drainage performance.

Figure 5:
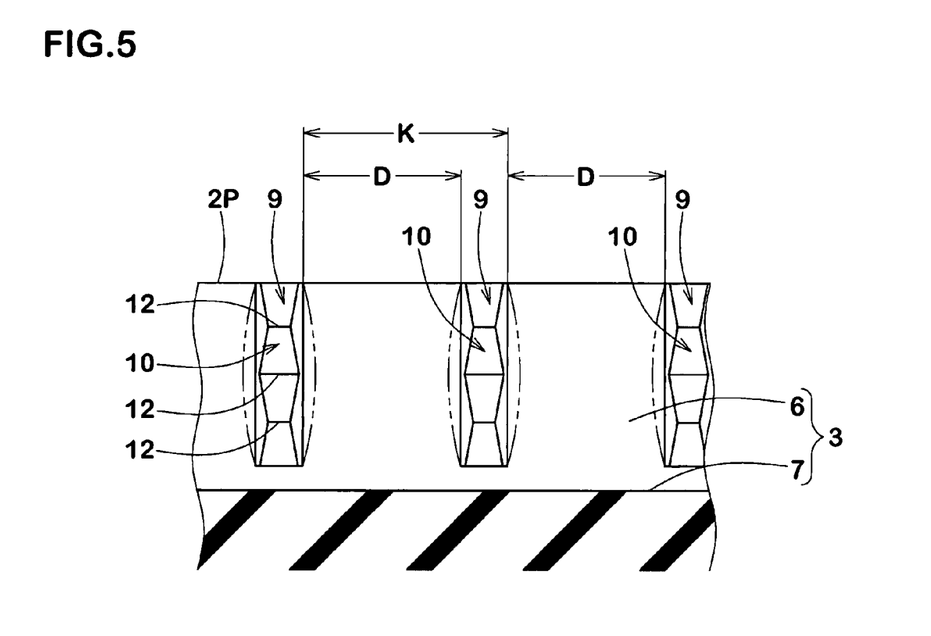
FIG. 5 is a cross sectional view taken on line C-C in FIG. 1.

As exaggeratedly shown in FIG. 5 by imaginary lines, the fine groove 9 repeats a deformation such that the groove 9 is compressed to widen when a circumferential groove 3 comes into contact with the ground, and the widened groove 9 returns to its original width when the circumferential groove 3 is released from the contact with the ground. In case that a large number of such fine grooves 9 are provided in the circumferential grooves 3 at a small interval, even if a so-called stone-biting occurs, the bitten stone is easy to contact the fine grooves 9, and the fine grooves 9 would serve to discharge the stone outside the circumferential grooves 3 by the deformation action as mentioned above.

As shown in FIG. 3, the fine groove 9 has a radially outer end 9o which opens at a ground contact surface 2P of the tread portion 2, and a radially inner end 9i, and it extends radially between the both ends 9o and 9i. The outer end 9o of the fine groove 9 may be disposed at a location radially inward of the ground contact surface 2P.

Although the fine grooves 9 in this embodiment extend along the radial direction, they may be inclined with respect to the radial direction. In that case, from the viewpoint of achieving efficient diffused reflection of a sound energy of an air current flowing along a circumferential groove 3, it is preferable that the inclination angle of the fine groove 9 is at most 45°, especially at most 30°, more especially at most 20°.

The length WL of the fine groove 9 in the radial direction of a tire is not particularly limited. However, since the noise reduction effect is not sufficiently exhibited if the radial length WL is too small, it is preferable that the radial length WL of the fine groove 9 is at least 50%, especially at least 60%, more especially at least 80%, of the groove depth GDt of the circumferential groove 3. Further, from the viewpoint of preventing the bottom of the circumferential groove 3 from cracking, it is also preferable that the radial length WL of the fine groove 9 is at most 100% of the groove depth GDt of the circumferential groove.

As shown in FIGS. 3 and 4, each of the fine grooves 9 in this embodiment includes a groove bottom 13 comprising the non-flat portion 10 and side walls 14 disposed on the both sides of the groove bottom 13, and has an approximately trapezoidal section. The cross sectional shape of the fine groove 9 may be other shapes such as a semicircle, a triangle, U-shape and the like.

In the cross section of the fine groove 9 perpendicular to the length direction of the groove 9, if the groove width gw or the groove depth gd (maximum depth) of the fine groove 9 is too small, the noise reduction effect tends to be sufficiently exhibited, and if they are too large, the rigidity is lowered and cracking is easy to occur due to strain during running. From such points of view, it is preferable that the groove width gw of the fine groove 9 is at least 0.5 mm, especially at least 1.0 mm, and is at most 4.0 mm, especially at most 3.0 mm. Similarly, it is preferable that the groove depth gd (maximum depth) of the fine groove 9 is at least 0.5 mm, especially at least 0.8 mm, and is at most 2.0 mm, especially at most 1.7 mm.

The non-flat portion 10 of the fine groove 9 in this embodiment is formed into a zigzag surface 10a which extends in a zigzag form in the length direction of the fine groove 9 (radial direction of a tire). Thus, the fine groove 9 extends radially with increasing and decreasing its depth gd. The zigzag surface 10a is formed of at least two faces which are inclined in opposite directions and are connected to each other to have one or a plurality of ridge lines 12 which extend in a direction crossing the tire radial direction (in other words, at least one vertex in the cross section perpendicular to the zigzag surface). In order to effectively disturb an air current in the circumferential groove 3, it is preferable that the zigzag surface 10a is formed of two to six faces, especially three to five faces, which are connected to have one to five ridge lines, especially two to four ridge lines. In the embodiment shown in FIGS. 1 to 6, the zigzag surface 10a has four faces connected to have three ridge lines 12.

If the amplitude A of the zigzag surface 10a (see FIG. 3) is too small, the effect of disturbing an air current inside the circumferential groove 3 tends to lower, and if it is too large, cracking starting from corners may occur to deteriorate the durability of tires. Therefore, it is preferable that in the cross section perpendicular to the zigzag surface 10a, the amplitude A of the zigzag surface 10a is at least 0.3 mm, especially at least 0.5 mm, and is at most 2.0 mm, especially at most 1.7 mm.

Figure 7:
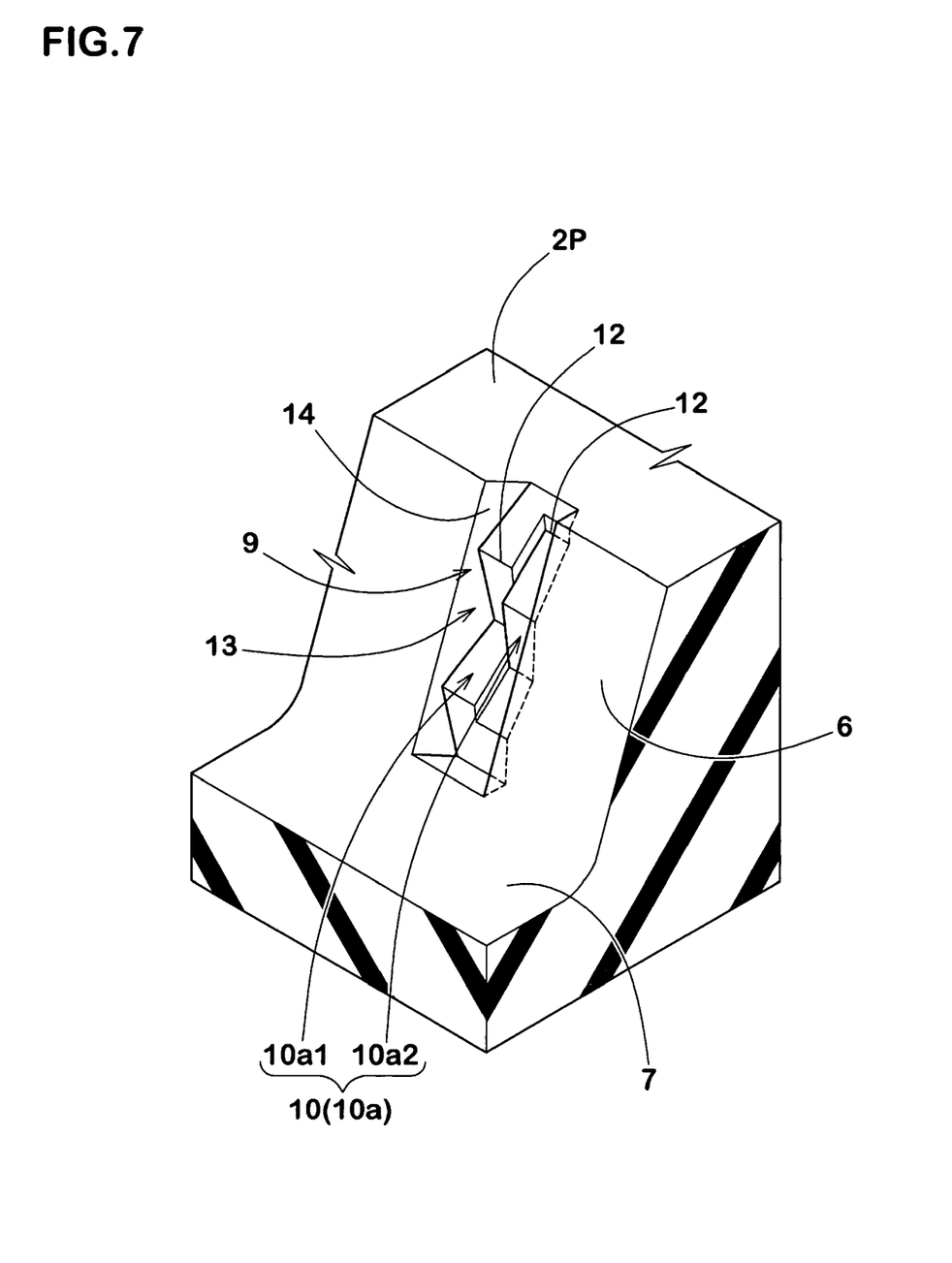
FIG. 7 is a perspective view of a fine groove showing another embodiment.

The zigzag surface 10a may comprise two or more rows of zigzag surfaces having different phases of a zigzag. For example, as shown in FIG. 7, the zigzag surface 10a may comprise a first zigzag surface 10a1 and a second zigzag surface 10a2 having a different phase zigzag from that of the first zigzag surface 10a1. In case of the zigzag surface 10a shown in FIG. 7, the first zigzag surface 10a1 and the second zigzag surface 10a2 are disposed side by side in the tire circumferential direction. The vertex of a mountain (or a valley) of the first zigzag surface 10a1 is shifted in a tire radial direction from the vertex of a mountain (or a valley) of the second zigzag surface 10a2. Since such a zigzag surface 10a comprising at least two rows of zigzag surfaces has a more complicated unevenness, it would reflect diffusely a sound wave in the circumferential groove 3 on a higher level and would more efficiently reduce the sound wave energy.

Figure 8:
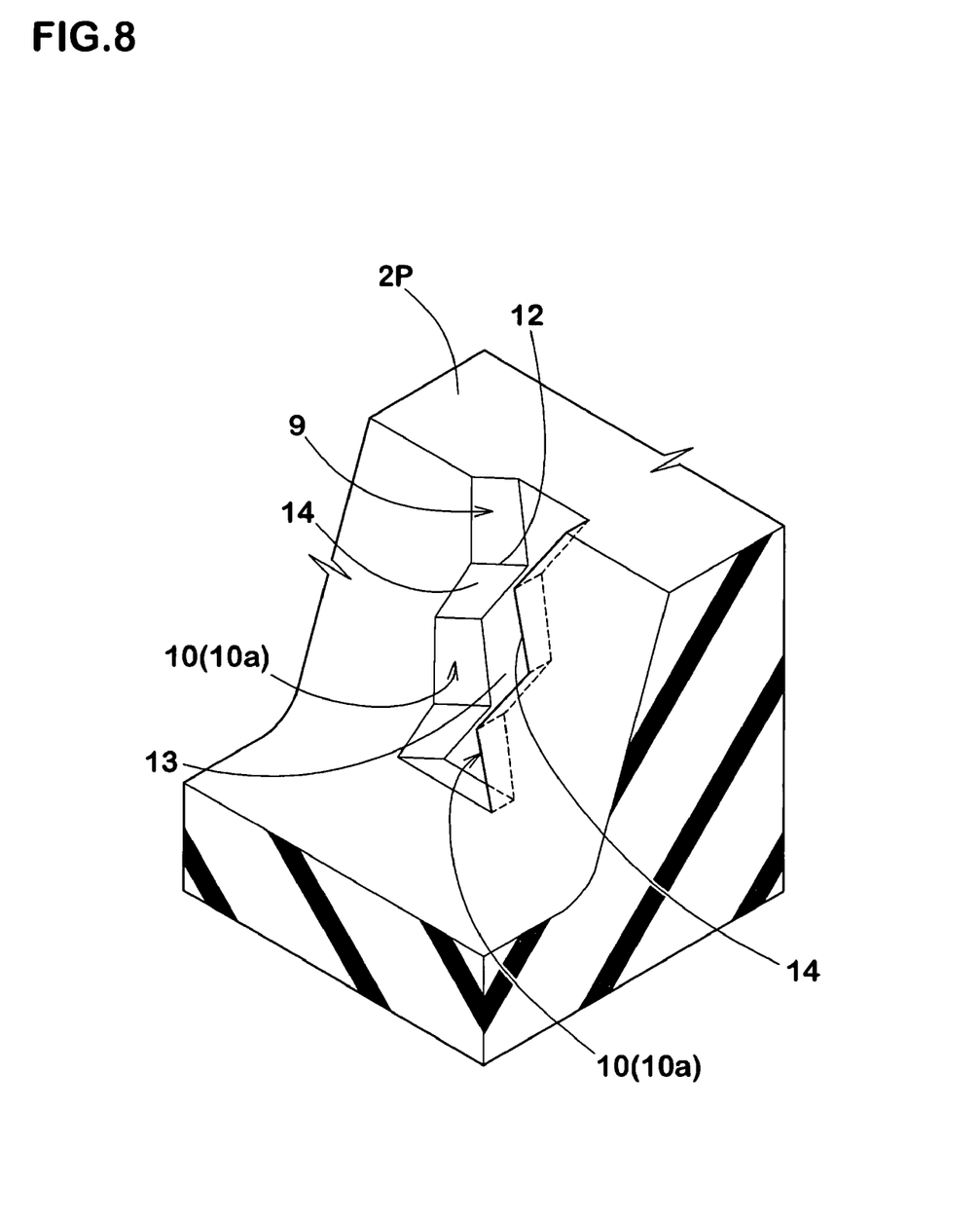
FIG. 8 is a perspective view of a fine groove showing a still another embodiment.

In each of the embodiments mentioned above, the side walls 14 of the fine groove 9 are formed of a smooth surface, but as shown in FIG. 8, either one of the side walls 14, preferably both side walls 14, may be provided with the non-flat surface 10 such as the zigzag surface 10a. In that case, the non-flat surface 10 may be further provided in the bottom 13 of the fine groove 9 or need not.

In order to more highly enhance the noise performance, it is preferable that the number of fine grooves 9 on one groove wall 6 per pitch of the circumferential groove 3 is 6 or more, especially 7 or more. On the other hand, if the fine grooves 9 are excessively formed, there is a possibility that the rigidity of the circumferential groove wall 6 between the fine grooves 9, 9 is lowered, and cracking starting from it or chipping of a rubber will occur owing to a strain occurring during running. Therefore, it is also preferable that the number of fine grooves 9 on one groove wall 6 per pitch of the circumferential groove 3 is 14 or less, especially 12 or less.

The term "pitch" of the circumferential groove 3 denotes a minimum unit constituting the repeating patterns of the circumferential groove 3, as shown by reference sign "P" in FIG. 2. In case that the circumferential groove 3 is a straight groove extending circumferentially in a straight line manner, the pitch of the groove 3 is determined based on a pitch of a constituent element of the tread pattern other than the circumferential groove 3, e.g., lateral grooves or rug grooves.

From the viewpoint of preventing the rigidity of the circumferential groove wall 6 between the fine grooves 9, 9 from lowering, the fine grooves 9 are disposed preferably at an interval D of 3.5 to 8.0 mm along the groove wall 6.

Further, as shown in FIGS. 2 and 4, preferably the fine grooves 9 are provided in both of the opposite walls 6, 6 of the circumferential main groove 3 at locations asymmetric with respect to the center line GL of the circumferential main groove 3. In other words, preferably, facing fine grooves 9, 9 are disposed so as to be shifted in the direction of the center line GL of the circumferential groove 3 in an amount "S". By disposing the fine grooves 9 in such a manner, maldistribution of fine grooves 9 is prevented and fine grooves 9 can be dispersedly disposed to increase a chance of contact of the fine grooves and an air current in the circumferential groove 3. The amount "S" of shift is not particularly limited. The amount "S" of-shift is from 0 to 50% of a pitch K in the circumferential direction of the fine grooves 9, and is preferably about ½ (about 50%) of the pitch "K".

The fine grooves 9 can be formed simultaneously when forming a tread pattern by means of a tire vulcanization mold, or can be formed, after vulcanization, by cutting.

The present invention is applicable to not only heavy duty tires, but also passenger car tires and motorcycle tires.

While a preferable embodiment of the present invention has been described with reference to the drawings, it goes without saying that the present invention is not limited to only such an embodiment and various changes and modifications may be made.

The present invention is more specifically described and explained by means of the following examples. It is to be understood that the present invention is not limited to these examples.

EXAMPLES

Figure 6:
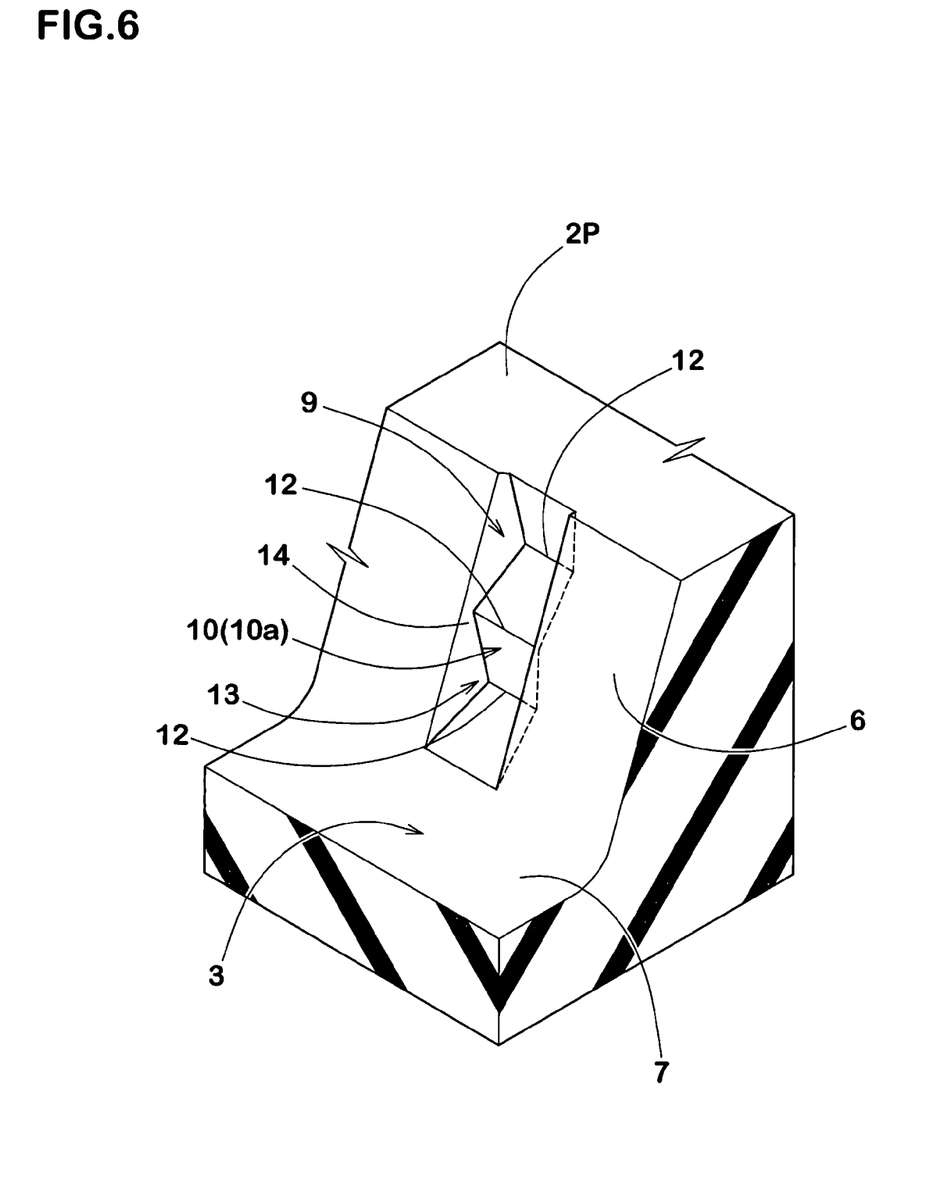
FIG. 6 is a perspective view of a fine groove in the tire of FIG. 1.

Heavy duty radial tires (size: 11R22.5 14PR) were manufactured based on the specifications shown in Table 1, and tested. The fine grooves formed in these examples were those having a non-flat portion in the form of a zigzag as shown in FIG. 6.

The performances of the tires were evaluated by the following methods.

<Noise Performance>

The tires were mounted on each rim (size: 7.50×22.5), inflated to an inner pressure of 800 kPa and attached to all wheels of a ten-ton 2-D truck (non-loaded). The test car was coasted for 50 m distance at a speed of 80 km/h on a test course. The maximum sound level in dB(A) of pass-by noise was measured at the middle point of the test course with a microphone set at 1.2 m height from the road surface and 7.5 m sideways from the running center line. The results are shown as an index based on the result of Comparative Example 1 regarded as 100. The smaller the value, the smaller the pass-by noise.

<Drainage Performance>

The above-mentioned test car was run on an asphalt road provided with a puddle having a depth of 5 mm, and full braking was applied to the car at a running speed of 60 km/hour in the ABS on state to measure the braking distance. An average value of five measurements was obtained. The results are shown as an index based on the result of Comparative Example 1 regarded as 100. The smaller the value, the better the drainage performance.

<Damage of Fine Grooves>

After the above-mentioned car was run 100,000 km, the fine grooves of the tires were visually observed with respect to presence or absence of damages such as cracking, chipping, cutting off or the like.

The results are shown in Table 1.

TABLE 1

|  | Com. Ex. 1 | Com. Ex. 2 | Ex. 1 | Ex. 2 | Ex. 3 | Ex. 4 | Ex. 5 |
| --- | --- | --- | --- | --- | --- | --- | --- |
| Fine grooves |  |  |  |  |  |  |  |
| Number of grooves per pitch in wall on one side | 0 | 8 | 8 | 8 | 8 | 8 | 8 |
| Groove width gw (mm) | — | 2.0 | 2.0 | 2.0 | 2.0 | 2.0 | 2.0 |
| Groove depth gd (mm) | — | 1.0 | 1.0 | 1.0 | 1.5 | 2.5 | 3.0 |
| Amplitude A of zigzag surface (mm) | — | 0 | 0.1 | 1.0 | 1.5 | 2.5 | 3.0 |
| Length WL (mm) | — | 16.5 | 16.5 | 16.5 | 16.5 | 16.5 | 16.5 |
| Depth of circumferential groove GDt (mm) | 16.5 | 16.5 | 16.5 | 16.5 | 16.5 | 16.5 | 16.5 |
| Noise performance (index) | 100 | 96 | 95 | 93 | 92 | 92 | 91 |
| Drainage performance (index) | 100 | 100 | 100 | 100 | 100 | 100 | 100 |
| Damage of fine grooves | — | none | none | none | none | damaged in part | damaged in part |

From the results shown in Table 1, it is confirmed that the pneumatic tires of the Examples according to the present invention have an improved noise performance without deteriorating the drainage performance.

What is claimed is:

1. A pneumatic tire comprising:
a tread portion provided with at least one circumferential main groove extending continuously in the tire circumferential direction, wherein
said circumferential main groove has a pair of groove walls, at least one of which is provided along the length thereof with radially extending fine grooves at intervals of 3.5 to 8.0 mm in the tire circumferential direction,
said fine grooves each have a groove width of from 0.5 to 4.0 mm and a maximum groove depth of from 0.5 to 2.0 mm,
each said fine groove is provided with a zigzag surface extending in a zigzag form in the length direction of the fine groove, and
said zigzag surface is formed by at least two faces arranged in the length direction of the fine groove while inclining alternately in opposite directions so as to have a zigzag amplitude of 0.3 to 2.0 mm, wherein the bottom of the fine groove has the zigzag surface such that the zigzag surface defines at least one trough defining said maximum depth and at least one peak between the inner end and outer end of the fine groove relative to the groove wall of the circumferential main groove.

2. The pneumatic tire of claim 1, wherein
said zigzag surface includes a first zigzag surface and a second zigzag surface, and the second zigzag surface is disposed adjacent to said first zigzag surface in a zigzag phase different from that of said first zigzag surface.

3. The pneumatic tire of claim 1, wherein
said at least one circumferential main groove is a pair of shoulder circumferential main grooves, and
said fine grooves are provided in both of the groove walls of each of said shoulder circumferential main grooves.

4. The pneumatic tire of claim 1, wherein
said fine grooves are provided in both of the groove wall surfaces at locations asymmetric with respect to the center line of the circumferential main groove.

5. The pneumatic tire of claim 1, wherein
said at least one circumferential main groove is a pair of middle circumferential grooves and a pair of shoulder circumferential main grooves.

6. The pneumatic tire of claim 1, wherein
said at least one circumferential main groove is a pair of middle circumferential grooves and a pair of shoulder circumferential main grooves, and
the tread portion is further provided with a crown circumferential groove provided with no fine grooves.

7. The pneumatic tire of claim 1, wherein
the tread portion is provided with lateral grooves intersecting said at least one circumferential main groove, and the lateral grooves are provided with no fine grooves.

8. The pneumatic tire of claim 1, wherein
said fine grooves each have a groove width of from 1.0 to 3.0 mm and a groove depth of from 0.8 to 1.7 mm.

9. The pneumatic tire of claim 8, wherein
said zigzag surface has a zigzag amplitude of 0.5 to 1.7 mm and 2 to 4 vertexes.

10. The pneumatic tire of claim 1, wherein
said zigzag surface has a zigzag amplitude of 0.5 to 1.7 mm and 2 to 4 vertexes.

* * * * *